Nov. 15, 1932.   W. L. BOND   1,887,538

COUPLING

Filed April 21, 1928

Inventor:
William L. Bond,
by Charles E. Mullan
His Attorney.

Patented Nov. 15, 1932

1,887,538

UNITED STATES PATENT OFFICE

WILLIAM L. BOND, OF SCHENECTADY, NEW YORK, ASSIGNOR TO GENERAL ELECTRIC COMPANY, A CORPORATION OF NEW YORK

COUPLING

Application filed April 21, 1928. Serial No. 271,829.

My invention relates to radio devices wherein a plurality of condenser shafts, or the like, are operated by a single control member, and has for its principal object the provision of an improved radio device wherein the shafts are electrically insulated from one another and coupled together by a coupling which has the rigidity of a solid coupling but does not require that the shafts be exactly alined with one another.

In uni-controlled radio receiving sets, for example, it is desirable to couple the rotors of the variable condensers mechanically in order to permit their simultaneous operation by a single control member. It is also desirable to electrically insulate them from one another and to prevent any relative movement of the rotors about the rotational axis after the initial adjustments are made, since such movement destroys the electrical alinement of the circuits.

In accordance with my invention, these results are produced by an improved coupling which includes an insulation member having great rigidity with respect to the torsional force exerted about its rotational axis but offering little resistance to the forces which are applied to it as a result of misalinement of the shafts.

Figure 1:
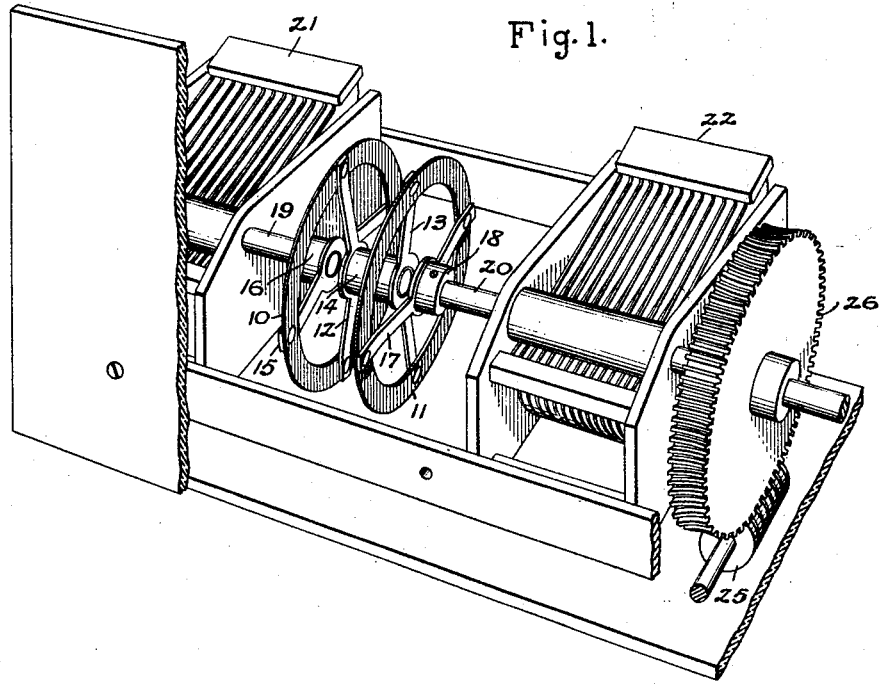
Figure 2:
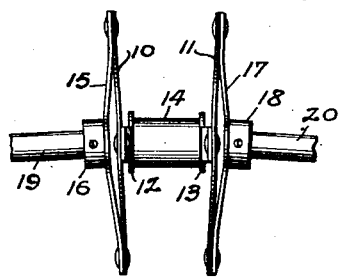

The novel features which I believe to be characteristic of my invention are pointed out in the appended claims. My invention itself, however, will best be understood by reference to the accompanying drawing in which Fig. 1 illustrates a coupling, constructed in accordance with my invention; Fig. 2 is another view of the coupling shown in Fig. 1, and Fig. 3 is a modification thereof.

Referring to the drawing, the coupling includes rings or washers 10 and 11 made of a material such as sheet fibre. These washers are held together at two diametrically opposite points by spacing means including metallic strips 12 and 13 the ends of which are attached to washers 10 and 11 respectively, and which are held together by a spacer 14. A member, including a metallic strip 15 similar to 12 and 13 having attached thereto a collar 16 adapted to engage the shaft 19 of the condenser 21, is attached to washer 10 at two points substantially equidistant from the points at which member 12 is attached thereto. A second member including metallic strip 17 and collar 18 is attached to washer 11 at points substantially equidistant from the points at which 13 is fastened thereto. Collar 18 is adapted to engage shaft 20 of condenser 22.

Figure 3:
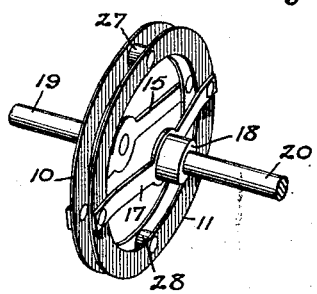

Fig. 3 illustrates a simplified spacing means consisting of spacers 27 and 28 which hold washers 10 and 11 together at two diametrically opposite points.

What I claim as new and desire to secure by Letters Patent of the United States is:—

1. The combination with a pair of rotatable shafts, of a coupling means therefor including a pair of washers flexible in a direction along the rotational axes of said shafts, spacing means attached to said washers at a plurality of points spaced from one another, and means including a pair of flexible strips for mechanically connecting one of said shafts to one of said washers and means including a pair of flexible strips for mechanically connecting the other of said shafts to the other of said washers at a plurality of points intermediate said spacing means.

2. The combination with a pair of rotatable members, of means for flexibly coupling said members whereby they may rotate one with the other, said means including a pair of insulating rings coaxial with the axis of rotation of said members, means including a pair of spacers mounted between said rings and circumferentially spaced apart from one another for connecting said rings together in spaced relation to each other, and means including a pair of flexible strips for connecting said rotatable members to said rings at points circumferentially spaced apart from one another, said strips and rings being flexible in a direction along the axis of rotation of said members.

In witness whereof, I have hereunto set my hand this 20th day of April 1928.

WILLIAM L. BOND.